(12) United States Patent
Ando et al.

(10) Patent No.: US 6,750,965 B2
(45) Date of Patent: Jun. 15, 2004

(54) MIRROR SUPPORTING STRUCTURE FOR MONOCHROMATOR

(75) Inventors: Hiroshi Ando, Tokyo (JP); Eiji Ishikawa, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 59 days.

(21) Appl. No.: 10/161,247

(22) Filed: May 31, 2002

(65) Prior Publication Data

US 2002/0180971 A1 Dec. 5, 2002

(30) Foreign Application Priority Data

May 31, 2001 (JP) .................................. 2001-165363

(51) Int. Cl.[7] ................................................ G01J 3/02
(52) U.S. Cl. ........................ 356/331; 248/479; 248/487; 359/876
(58) Field of Search ................................ 356/326, 328, 356/331, 332, 333, 334; 248/479, 487; 359/876

(56) References Cited

U.S. PATENT DOCUMENTS 2,868,063 A * 1/1959 Weiss .......................... 356/332

* cited by examiner

Primary Examiner—F. L. Evans
(74) Attorney, Agent, or Firm—Flynn, Thiel, Boutell & Tanis, P.C.

(57) ABSTRACT

There is provided a mirror supporting structure for a monochromator capable of turning the mirrors about axis lines which cross each other, thereby adjusting the attachment angles of the mirrors in two directions. The mirror supporting structure for a monochromator comprises first angle adjusting means for turning the mirrors about each first axis line which does not cross each plane direction of the mirrors and second angle adjusting means for turning the mirrors about each second axis line which does not cross each plane direction of the mirrors at right angles but is parallel with a line crossing the first axis line. The first angle adjusting means comprises a first leg member and a second leg member which are disposed to be spaced from each other, and a support member installed between the first leg member and the second leg member and supporting the mirrors, and wherein the mirrors are supported by the support member in a manner that each plane direction of the mirrors does not cross the installing direction of the support member at right angles, and the support member can be turned about a line which is parallel with the installing direction of the support member.

6 Claims, 7 Drawing Sheets

MIRROR SUPPORTING STRUCTURE FOR MONOCHROMATOR

FIELD OF THE INVENTION

The invention relates to a mirror supporting structure for a monochromator, particularly to a mirror supporting structure for a monochromator suitably applicable to an optical spectrum analyzer.

BACKGROUND OF THE INVENTION

In a monochromator used for an optical spectrum analyzer, a mirror is installed for irradiating light toward spectro-elements such as diffraction grating. To correct a light path of reflected light by a mirror, a mirror supporting structure for a monochromator is provided with an angle adjusting means for finely adjusting the attaching angles of the mirror.

Such a conventional mirror supporting structure 40 for a monochromator is described hereinafter with reference to the attached drawings. FIG. 6 is a view showing a conventional mirror supporting structure 40 for a monochromator, FIG. 7(A) is a plan view of FIG. 6 and FIG. 7(B) is a side view of FIG. 6. As shown in FIG. 6 and FIGS. 7(A), 7(B), the mirror supporting structure 40 for a monochromator comprises a plate-like base 41, a mirror holding block 42 mounted on the base 41 and a mirror 43 fixed to the mirror holding block 42. The mirror holding block 42 is fixed to the base 41 via bolts 52 and the mirror 43 is fixed to a mirror bonding face of the mirror holding block 42 by an adhesive and the like. The mirror supporting structure 40 for a monochromator having such a construction has angle adjusting means 45 provided in the mirror holding block 42.

The angle adjusting means 45 comprises a slit 44 which is formed in the mirror holding block 42 and is parallel with the plane direction of the base 41, a slit upper wall part 42a and a slit lower wall part 42b which are respectively disposed on the mirror holding block 42 so as to sandwich the slit 44 therebetween, slit opening screws 61a, 61b and slit closing screws 61c, 61d.

The slit opening screws 61a, 61b are threaded into screw holes provided on the slit upper wall part 42a, and tip ends thereof are brought into contact with the slit lower wall part 42b. When the slit opening screws 61a, 61b are turned so as to be fastened, the tip ends thereof push the slit lower wall part 42b to open the slit 44. As a result, the mirror 43 is turned about the innermost part 44a of the slit 44 clockwise in FIG. 7(B).

Meanwhile, the slit closing screws 61c, 61d are inserted into the insertion holes provided in the slit upper wall part 42a, and the tip ends are threaded into the holes provided on the slit lower wall part 42b. When the slit closing screws 61c, 61d are turned so as to be fastened, the heads thereof push the slit upper wall part 42a to close the slit 44 so that the mirror 43 is turned about the innermost part 44a of the slit 44 counterclockwise in FIG. 7(B).

With the angle adjusting means 45 having the foregoing construction, when the slit 44 is opened or closed, the mirror holding block 42 is deformed so that the mirror 43 supported by the mirror holding block 42 is inclined so that the angle of the mirror can be adjusted by turning the mirror 43 about the innermost part 44a of the slit 44.

However, the conventional mirror supporting structure 40 for a monochromator has the angle adjusting means 45 alone as means for adjusting the angle of the mirror 43, and the mirror supporting structure 40 can turn the mirror 43 only about the axis line in one direction. Accordingly, there has been required a mirror supporting structure for a monochromator which can turn the mirrors about the axis line in one direction and also in an axis line crossing this axis line in other direction, namely, can turn the mirrors in two directions.

SUMMARY OF THE INVENTION

The invention has been made to satisfy the foregoing requirement and it is an object of the invention to provide a mirror supporting structure for a monochromator capable of turning mirrors for the monochromator about axis lines which cross each other when the attachment angles of the mirrors of the monochromator are adjusted, thereby turning the mirrors for monochromator to adjust the attachment angles of the mirrors in two directions.

The mirror supporting structure for a monochromator of a first aspect of the invention is characterized in comprising first angle adjusting means for turning mirrors about a first axis line which does not cross each plane direction of the mirrors at right angles, and second angle adjusting means for turning the mirrors about a second axis line which does not cross each plane direction of the mirrors at right angles but is parallel with a line crossing the first axis line.

For the first angle adjusting means and the second angle adjusting means, a conventional structure or a structure having a bearing, a shaft and the like may be employed. Further, the first axis line of the first angle adjusting means and the second axis line of the second angle adjusting means may cross each other at right angles or may cross each other at a given angle.

The crossing at right angles or the crossing means a case where the first axis line of the first angle adjusting means and the second axis line of the second angle adjusting means are arranged in parallel with imaginary lines which cross each other at right angles or cross each other at a given angle as well as a case where the first axis line of the first angle adjusting means and the second axis line of the second angle adjusting means directly cross each other. With the mirror supporting structure for a monochromator having the foregoing construction, since the first and second angle adjusting means are provided and the first axis line of the first angle adjusting means and the second axis line of the second angle adjusting means cross each other, the attachment angles of the mirrors can be adjusted in two directions, thereby obtaining the foregoing object.

Further, the mirror supporting structure for a monochromator of the second aspect of the invention is characterized in that the first angle adjusting means of the first aspect of the invention comprises a first leg member and a second leg member which are spaced from each other, and a support member installed between the first and second leg members for supporting the mirrors, wherein the mirrors are supported in a manner that each plane direction of the mirrors do not cross the installing direction of the support member and the support member can be turned about a line which is parallel with the installing direction thereof.

For the support member, e.g. a plate-like or a bar member can be exemplified, and a structure for holding the mirrors via block-shaped mirror support member and the like can be employed. The support member may have folded parts at both ends, i.e. may be formed of substantially a U-shape, and it may have a structure to be turned about the first leg member and the second leg member via respective folded parts.

With the mirror supporting structure for a monochromator of the second aspect of the invention, since the mirrors are supported by the support member installed between the first and second leg members, the mirrors constituting the monochromator can be reliably attached, and the attachment angles of the mirrors can be freely adjusted.

With the mirror supporting structure for a monochromator of the second aspect of the invention, if the support member is formed substantially in U-shape, the first axis line of the first angle adjusting means and the second axis line of the second angle adjusting means can be disposed relatively to approach to each other, thereby minimizing the movement of the mirrors involved in the adjustment of the attachment angles.

The mirror supporting structure for a monochromator according to the third aspect of the invention is characterized in that multiple mirrors are attached to the support member. Respective mirrors may be disposed in substantially plane symmetry while sandwiching the plane which crosses the installing direction of the support member at right angles or may be disposed in the same direction. With such an arrangement, the multiple mirrors can be adjusted in their attachment angles, for example, they can be effectively applied to a single path type monochromator wherein incident light passes through diffraction grating one time, and also to a multi-path type monochromator wherein incident light passes the diffraction grating two times.

The mirror supporting structure for a monochromator according to the fourth aspect of the invention is characterized in that the first angle adjusting means is arranged such that one end of the support member in the installing direction of the support member is connected to the first leg member via a bearing while the other end of the support member in the installing direction of the support member is connected to the second leg member via a cylinder member, and wherein an axis line of the bearing and an axis line of the cylinder member are aligned with the same line which is parallel with the installing direction of the support member.

Since one end of the support member in the installing direction and the first leg member are connected to each other via the bearing, while the other end of the support member and the second leg member are connected to each other via the cylinder member, it is possible to provide a protrusion on the other end of the support member, and the second leg member may be fixed to the protrusion so as to engage therein, for example, by aligning the cylinder member with the axis line of the bearing, while the protrusion is engaged in the hole of the cylinder member so as to align the axis line of the cylinder member with that of the bearing so as to form a single axis line (first axis line), so that the support member can be installed between the first and second leg members without generating distortion in the support member. Further, the thus installed support member can be more smoothly turned about the first axis line which is in parallel with the installing direction by use of the bearings so as to adjust the attachment angles of the mirrors.

The mirror supporting structure for a monochromator according to the fifth aspect of the invention is characterized in that the second angle adjusting means has holding blocks supported by the support member for holding the mirrors, slits which are formed in the holding blocks and are continuous along a plane substantially parallel with the installing direction of the support member and sandwiched between a pair of walls, slit opening screws and slit closing screws penetrating one of walls in a direction of the thickness of the walls, and wherein the slit opening screws are threaded into one of walls, and tip ends of the slit opening screws are brought into contact with the other of the walls, and wherein the slit closing screws are inserted into one of the walls, and tip ends of the slit closing screws are threaded into the other of the walls.

With such a second angle adjusting means, for example, when the slit opening screws which are threaded into the slit upper walls of the slits are fastened, the tip ends thereof press the slit lower walls so that the slits are opened, and hence the mirrors are turned about the uppermost part (second axis line) of the slit.

Meanwhile, when the slit closing screws which are inserted into slit upper walls and threaded into slit lower walls are fastened, the heads thereof press the upper slit walls so that the slits are closed, and hence the mirrors are turned about the uppermost part (second axis line) of the slits (in a direction opposite to a case where the slit opening screws are fastened).

With such a second angle adjusting means, when the slits are opened or closed, the holding blocks are deformed, and the mirrors held by the holding blocks are inclined so that the attachment angles of the mirrors can be adjusted to a direction crossing the first axis line of the first angle adjusting means at right angles or a given angle.

The mirror supporting structure for a monochromator according to the sixth aspect of the invention is characterized in that both the first and second axis lines are parallel with pair of lines which cross each other at right angles. As a result, when the attachment angles of the mirrors of the monochromator are adjusted, such attachment angles of the mirrors can be adjusted in two directions which cross each other, thereby the mirrors can be easily disposed in desired three-dimensional directions.

PREFERRED EMBODIMENT OF THE INVENTION

Figure 1:
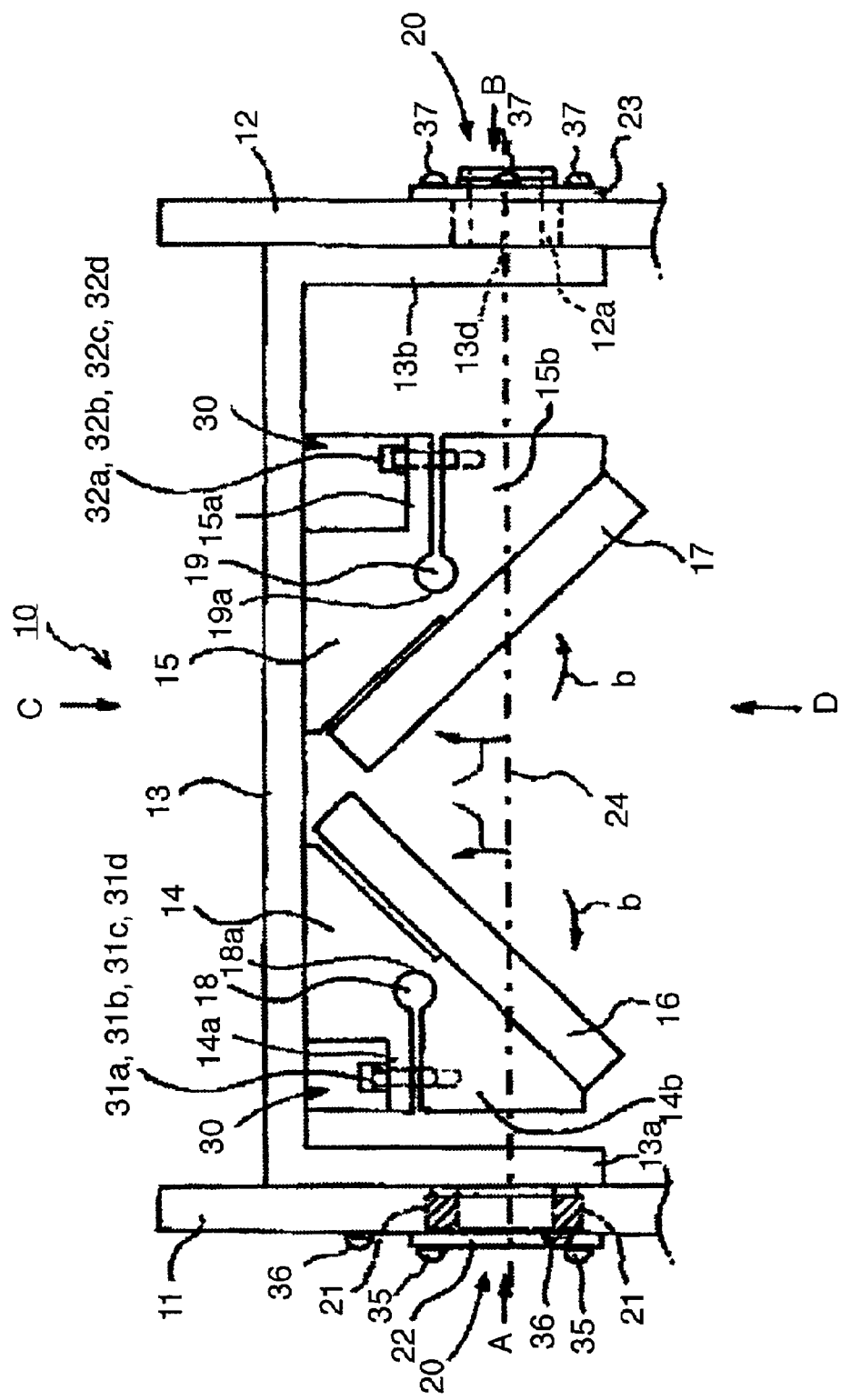
FIG. 1 is a view showing a mirror supporting structure for a monochromator according to a preferred embodiment of the invention.
Figure 2A:
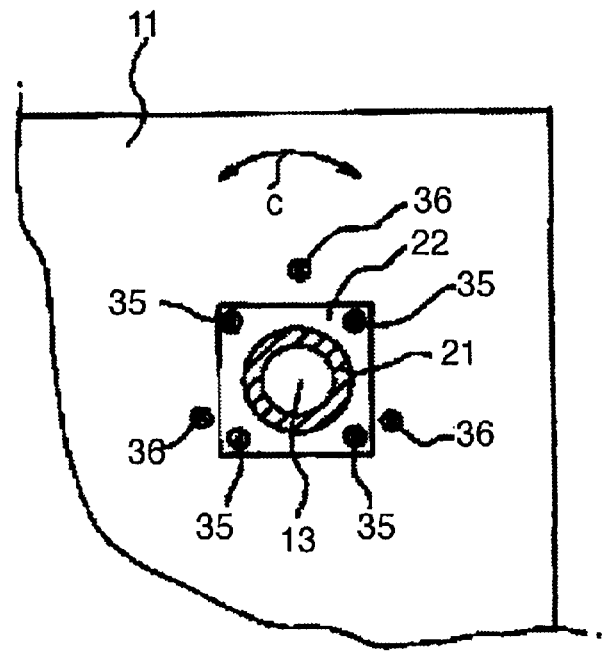
FIG. 2(A) is a view as viewed from the arrow (A) in FIG. 1.
Figure 2B:
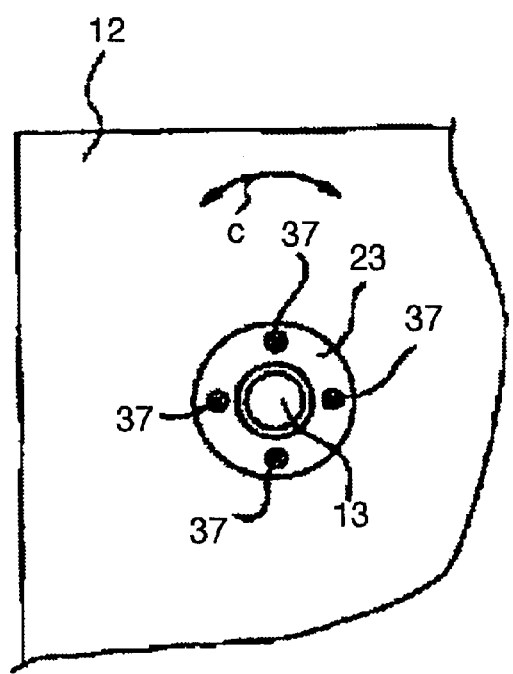
FIG. 2(B) is a view as viewed from the arrow (B) in FIG. 1.
Figure 3A:
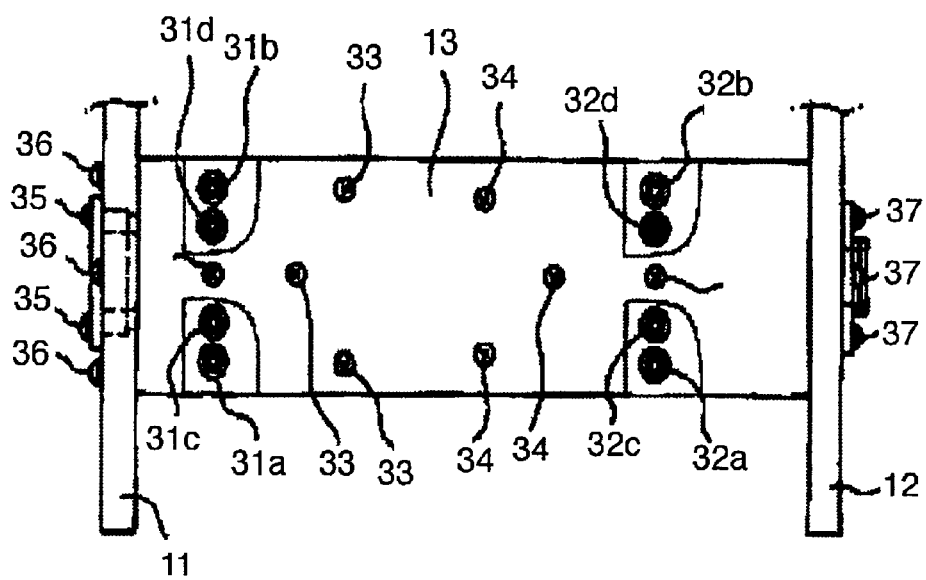
FIG. 3(A) is a view as viewed from the arrow (C) in FIG. 1.
Figure 3B:
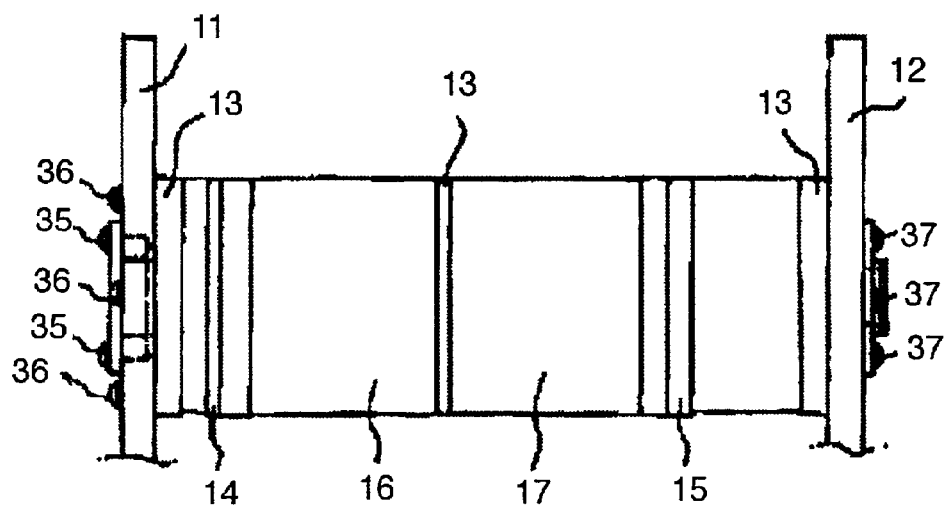
FIG. 3(B) is a view as viewed from the arrow (D) in FIG. 1.

FIG. 1 is a view showing a mirror supporting structure for a monochromator according to a preferred embodiment of the invention, FIG. 2(A) is a view as viewed from the arrow (A) in FIG. 1, and FIG. 2(B) is a view as viewed from the arrow (B) in FIG. 1 and FIG. 3(A) is a view as viewed from the arrow (C) in FIG. 1, and FIG. 3 (B) is a view as viewed from the arrow (D) in FIG. 1.

As shown in FIG. 1, a mirror supporting structure 10 for a monochromator comprises a first leg member 11, a second leg member 12, holding blocks 14, 15 supported by a support member 13, mirrors 16, 17 held by the holding blocks 14, 15, first angle adjusting means 20 and second angle adjusting means 30.

The holding blocks 14, 15 are formed in substantially a triangular prism, and inclined surfaces 16a, 17a of the holding blocks 14, 15 which cross each other at a given angle relative to the installing direction of the support member 13 are disposed substantially symmetrically with respect to a plane which crosses the installing direction of the support member 13 at right angles and demarcates the holding blocks 14, 15.

The mirrors 16, 17 have substantially flat mirror surfaces, and they are held by the inclined surfaces 16a, 17a of the holding blocks 14, 15. Accordingly, the mirrors 16, 17 are disposed in substantially plane symmetry in the direction of the support member 13.

Figure 4:
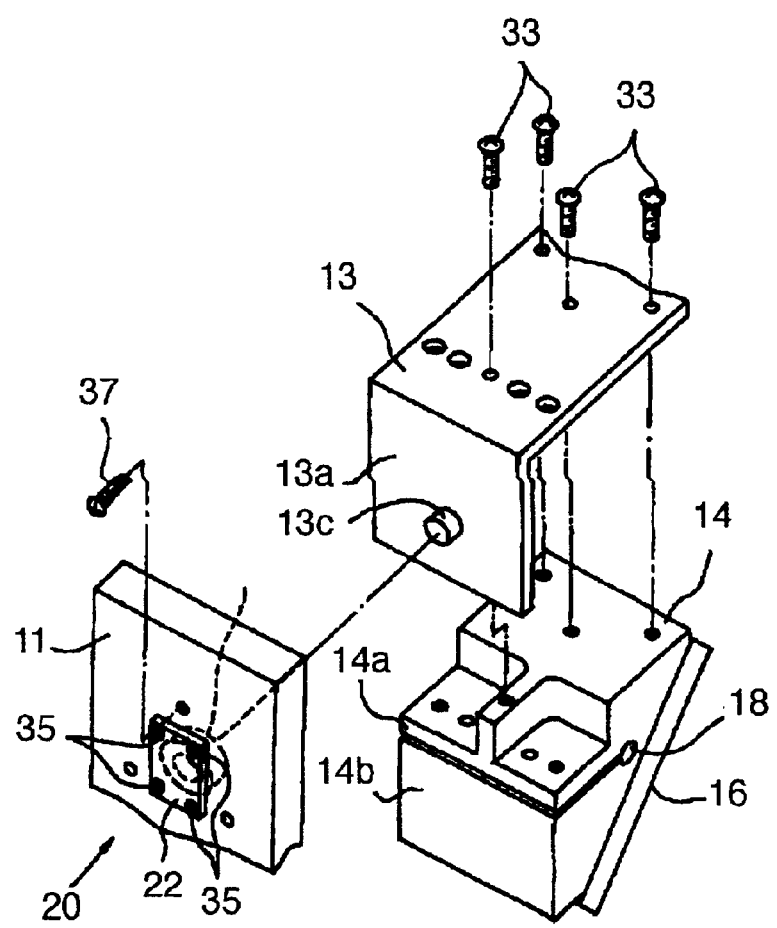
FIG. 4 is an exploded perspective view showing the connection between a plate or first leg and a support block or support member and the connection between the support member and a mirror holding block respectively of the mirror supporting structure for a monochromator according to the preferred embodiment of the invention.

The first angle adjusting means 20 is described in detail with reference to FIGS. 1 to 4. FIG. 4 is an exploded perspective view showing the connection between the first leg member 11 and the support member 13 and the connection between the support member 13 and the holding block 14.

As shown in FIGS. 1 to 4, the first angle adjusting means 20 has folded parts 13a, 13b provided at both ends of the support member 13 in the installing direction thereof, a protrusion 13c provided on the folded part 13a, a bearing 21 interposed between the protrusion 13c and the first leg member 11, a protrusion 13d provided on the folded part 13b and a cylinder member 23 for supporting the protrusion 13d.

As shown in FIGS. 2 and 4, the bearing 21 is press-fitted in a through hole defined in the first leg member 11 for connecting the folded part 13a to the first leg member 11. Bearing pressing part 22 fixes the bearing 21 to the first. leg member 11 via the bearing pressing part fixed screw 35. As shown in FIGS. 1 and 2, the cylinder member 23 supports the protrusion 13d inserted into an insert hole 12a formed in the second leg member 12, and it is fixed to the second leg member 12 via cylinder member fixed screws 37.

The first angle adjusting means 20 is structured such that the bearing 21 and the cylinder member 23 are disposed coaxially, and it can turn the mirrors 16, 17 about an axis line (first axis line) 24 of the bearing 21 and cylinder member 23 in the direction depicted by the arrow c in FIGS. 2(A) and 2(B), via support member 13 and holding blocks 14, 15, and also it can be held by a bent part 36 at a desired angle.

Figure 5:
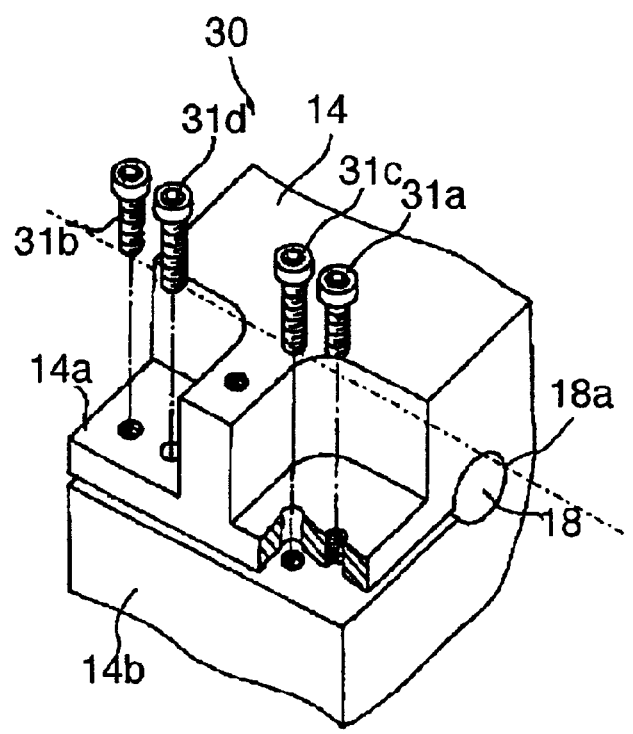
FIG. 5 is a perspective view showing second adjusting means in the mirror supporting structure for a monochromator according to the preferred embodiment of the invention.
Figure 6:
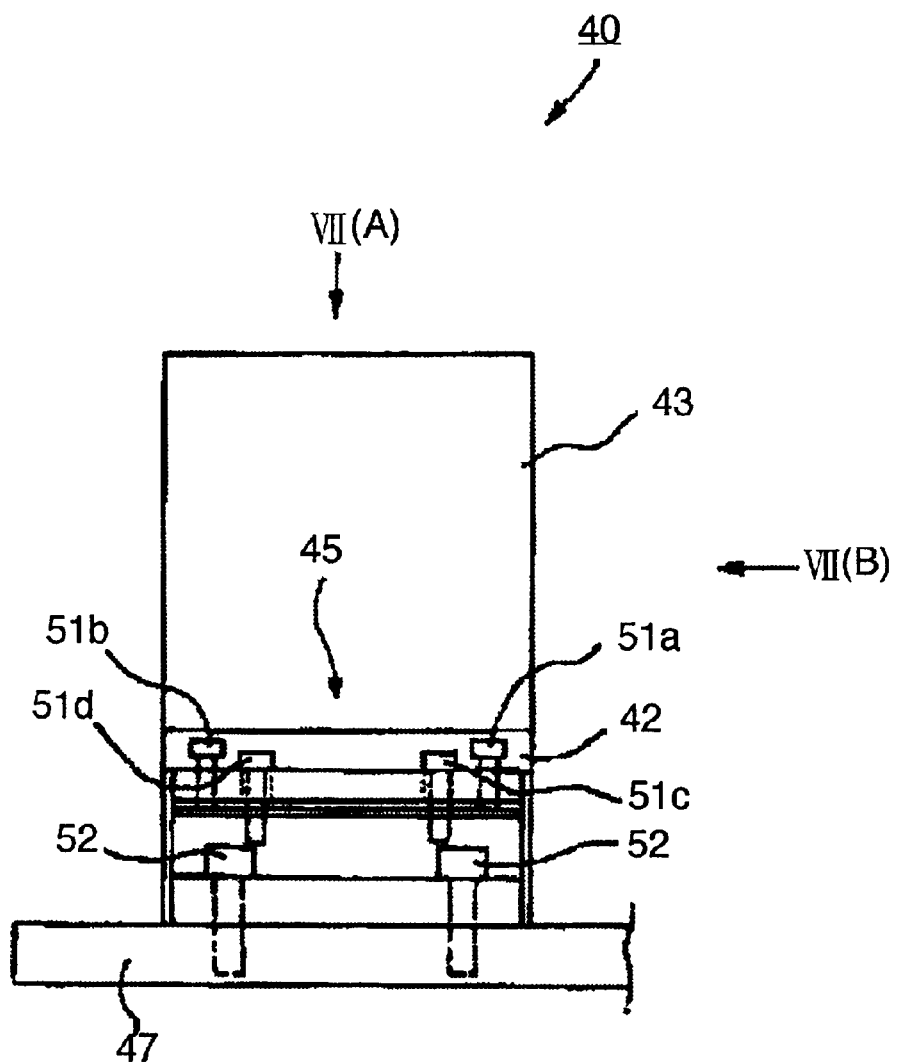
FIG. 6 is a view showing a conventional mirror supporting structure for a monochromator.
Figure 7A:
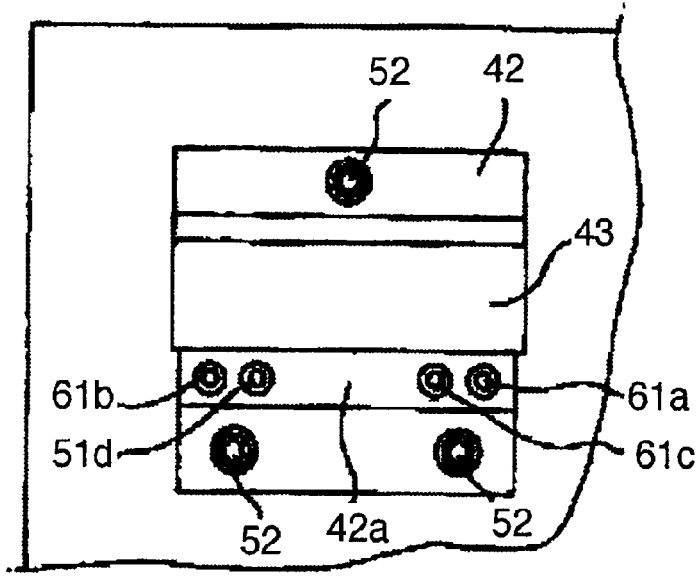
FIG. 7(A) is a plan view of the structure shown in FIG. 6 as viewed in the direction of arrow VII(A)
Figure 7B:
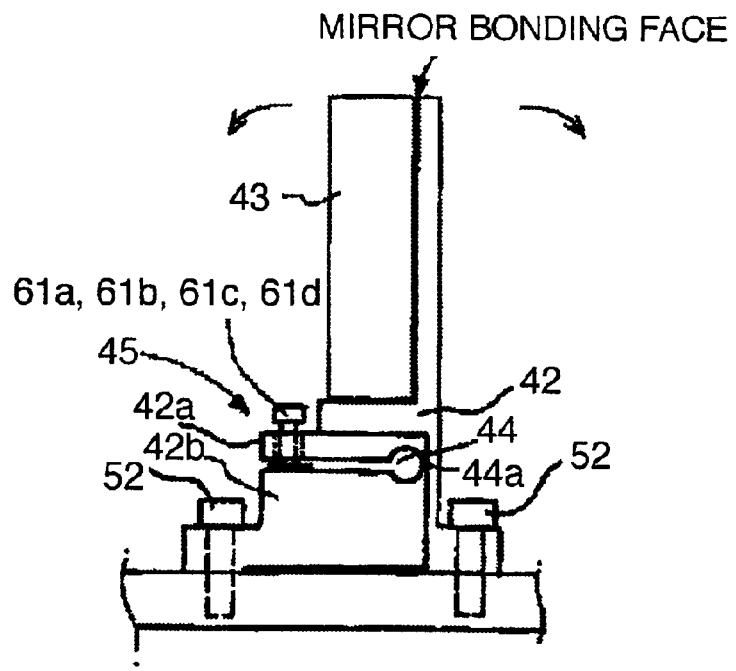
FIG. 7(B) is a side view of the structure shown in FIG. 6 as viewed in the direction of arrow VII(B).

The second angle adjusting means 30 is now described with reference to FIG. 1, FIG. 4 and FIG. 5. FIG. 5 is a perspective view showing the second angle adjusting means 30.

As shown in FIG. 1, FIG. 4 and FIG. 5, the second angle adjusting means 30 comprises slits 18, 19 defined in the holding blocks 14, 15, slit upper wall parts 14a, 15a, slit lower wall parts 14b, 15b of the holding blocks 14, 15, slit opening screws 31a, 31b, 32a, 32b and slit closing screws 31c, 31d, 32c, 32d.

As shown in FIG. 5, the slit opening screws 31a, 31b, 32a, 32b are screwed into screw holes defined in the slit upper wall parts 14a, 15a and they are respectively brought into contact with the slit lower wall parts 14b, 15b at their tip ends. When the slit opening screws 31a, 31b, 32a, 32b are turned to be fastened, the tip ends thereof press the slit lower wall parts 14b, 15b so that the slits 18, 19 are opened. As a result, the mirrors 16, 17 are turned about innermost parts (second axis line) 18a, 19a in the direction depicted by the arrow a in FIG. 1.

Meanwhile, the slit closing screws 31c, 31d, 32c, 32d are inserted into through holes defined in the slit upper wall parts 14a, 15a, and the tip ends thereof are threaded into screw holes defined in the slit lower wall parts 14b, 15b. When the slit closing screws 31c, 31d, 32c, 32d are turned to be fastened, the heads thereof press the slit upper wall parts 14a, 15a, so that the slits 18, 19 are closed, and hence the mirrors 16, 17 are turned about the innermost parts (second axis line) 18a, 19a in a direction denoted by the arrow b shown in FIG. 1 (direction opposite to the direction where slit opening screws are fastened).

Accordingly, with the second angle adjusting means 30 having the foregoing construction, when the slits 18, 19 are opened or closed, the holding blocks 14, 15 are deformed so that the mirrors 16, 17 held by the holding blocks 14, 15 are inclined. As a result, the attachment angle of the mirrors 16, 17 can be adjusted when the mirrors 16, 17 are turned about the innermost parts (second axis line) 18a, 19a.

When the slit opening screws 31a, 32a, and the slit opening screws 31b, 32b are not fastened at the same level or amount but either of them are loosened, or when the slit closing screws 31c, 32c, and the slit closing screws 31d, 32d are not fastened at the same amount but either of them are loosened, the attachment angles of the mirrors 16, 17 can be adjusted in a direction opposite to the turning direction.

The mirror supporting structure 10 for a monochromator according to the invention having the foregoing construction, the attachment angles of the multiple mirrors 16, 17 can be adjusted in two directions by the first angle adjusting means 20 and second angle adjusting means 30.

Since the mirrors 16, 17 are supported by the support member 13 which is installed between the first leg member 11 and second leg member 12, the mirrors 16, 17 constituting the monochromator can be reliably attached, and the attachment angles of the mirrors can be freely adjusted.

Since the support member 13 is formed in substantially a U-shape and has folded parts 13a, 13b in the installing direction, the first axis line 24 of the first angle adjusting means 20 and the second axis line (the slit innermost parts 18a, 19a of the second angle adjusting means 30) can be disposed relatively to approach to each other, so that the movement of the mirrors 16, 17 involved in the adjustment of the attachment angles thereof can be minimized.

When the cylinder member 23 is fixed to the second leg member 12 while aligned with a position along the axis line of the bearing 21 and the protrusion 13d is engaged in the hole of the cylinder member 23, the axis line of the cylinder member 23 and that of the bearing 21 are aligned with each other to form one axis line (the first axis line 24), thereby installing the support member 13 without generating distortion in the support member 13. Accordingly, it is possible to adjust the attachment angles of the mirrors 16, 17 by smoothly turning the support member 13 about the first axis line which is parallel with the installing direction (first axis line)using the bearing 21.

When the second angle adjusting means 30 opens and closes the slits 18, 19 to deform the holding blocks 14, 15, the mirrors 16, 17 held by the holding blocks 14, 15 are inclined, thereby adjusting the attachment angles of the mirrors 16, 17 in the direction crossing the first axis line 24 of the first angle adjusting means 20 at right angles, and easily disposing the mirrors 16, 17 in desired dimensional directions.

The mirror supporting structure for a monochromator of the invention can be applied not only to a single-path type monochromator wherein incident light passes a diffraction grating one time but also to a multi-path type monochromator wherein incident light passes a diffraction grating two times or more.

The invention is not limited to the preferred embodiment set forth above but can be appropriately modified and improved. For example, materials, shapes, dimensions, configurations, numbers, locations of disposition and the like of the mirrors, the first axis line, the first angle adjusting means, the second axis line, the second angle adjusting means, the first leg member, the second leg member, the support member, the bearings, the cylinder members, the holding blocks, the slits, the slit opening screws and the slit closing screws in the preferred embodiment of the mirror supporting structure for a monochromator as exemplified set forth in the preferred embodiment are optional if they achieve the object of the invention.

According to the invention, since the first axis line of the first angle adjusting means and the second axis line of the second angle adjusting means cross each other, it is possible to provide a mirror supporting structure for a monochromator capable of adjusting the mirrors in two directions.

According to the invention, since the mirrors are supported by the support member in the manner that plane direction of the mirrors do not cross the installing direction of the support member, and further the support member can be turned about a line which is parallel with the installing direction, the mirrors constituting the monochromator can be reliably attached to the support member and the attachment angles of the mirrors can be freely adjusted. Still further, if the mirror supporting structure for a monochromator is formed substantially in a U-shape, the first axis line of the first angle adjusting means and the second axis of the second angle adjusting means can be disposed relatively to approach each other, thereby providing a mirror supporting structure for a monochromator capable of minimizing the movement of the mirrors involved in the adjustment of the attachment angles of the mirrors.

According to the invention, since the multiple mirrors are attached to the support member, it is possible to provide a mirror supporting structure for a monochromator capable of adjusting the attachment angles of the multiple mirrors in two directions and of being applied to the single path type monochromator wherein incident light passes a diffraction grating one time but also to a multi-path type monochromator wherein incident light passes a diffraction grating two times or more.

According to the invention, since the first angle adjusting means is connected to one end of the support member via the bearing, and to the other end thereof via the cylinder member, the axial line of the bearing and that of the cylinder member are arranged coaxially on the line which is parallel with the installing direction. As a result, the axial line of the bearing and that of the cylinder member are aligned with each other to form one axis line (first axis line), thereby providing a mirror supporting structure for a monochromator capable of installing the support member without generating distortion in the support member. Further, it is possible to provide a mirror supporting structure for a monochromator capable of adjusting the attachment angles of the mirrors by smoothly turning the support member about the first axis line which is parallel with the installing direction (first axis line) using the bearing.

According to the invention, the second adjusting means is structured that slit opening screws are threaded into one of walls and the tip ends thereof are brought into contact with the other of the walls while the slit closing screws are inserted into one of walls and the tip ends of the slit closing screws are engaged into the other of the walls. As a result, the holding blocks can be deformed by opening and closing the slits to incline the mirrors supported by the holding blocks, it is possible to provide a mirror supporting structure for a monochromator capable of adjusting the attachment angles of mirrors in a direction crossing the first angle adjusting means at right angles or at a given angle.

According to the invention, since the first axis line and the second axis line are parallel with a pair of lines which cross each other at right angles, it is possible to provide a mirror supporting structure for a monochromator capable of adjusting the attachment angles of the mirrors in two directions which cross each other at right angles when the attachment angles of the mirrors are adjusted, and of being disposed in desired three-dimensional directions.

What is claimed is:

1. A mirror supporting structure for a monochromator comprising:
    first angle adjusting means for turning mirrors about a first axis line which does not cross a plane direction of the mirrors at right angles; and
    second angle adjusting means for turning the mirrors about a second axis line which does not cross the plane direction of the mirrors at right angles but is parallel with a line crossing the first axis line.

2. The mirror supporting structure for a monochromator according to claim 1, wherein the first angle adjusting means comprises a first leg member and a second leg member which are disposed to be spaced from each other, and a support member installed between the first leg member and the second leg member and supporting the mirrors, and wherein the mirrors are supported in a manner that the plane direction of the mirrors does not cross the installing direction of the support member at right angles, and the support member can be turned about a line which is parallel with the installing direction of the support member.

3. The mirror supporting structure for a monochromator according to claim 2, wherein multiple mirrors are attached to the support member.

4. The mirror supporting structure for a monochromator according to claim 2, wherein the first angle adjusting means is arranged such that one end of the support member in the installing direction of the support member is connected to the first leg via bearings while the other end of the support member in the installing direction of the support member is connected to the second leg member via a cylinder member, and wherein an axis line of the bearing and axis line of the cylinder member are aligned with the same line which is parallel with the installing direction of the support member.

5. The mirror supporting structure for a monochromator according to claim 2, wherein the second angle adjusting means has holding blocks supported by the support member for holding the mirrors, slits which are formed in the holding blocks and are continuous along a plane substantially parallel with the installing direction of the support member and sandwiched between a pair of walls, and slit opening screws and slit closing screws penetrating one of walls in a direction of the thickness of the wall;

wherein the slit opening screws are threaded into one of walls, and tip ends of the slit opening screws are brought into contact with the other of the walls; and wherein the slit closing screws are inserted into one of the walls and tip ends of the slit closing screws are threaded into the other of the walls.

6. The mirror supporting structure for a monochromator according to claim 1, wherein both the first and second axis lines are parallel with pair of lines which cross each other at right angles.

* * * * *